Aug. 7, 1962 R. O. PARK Re. 25,219

STOP DEVICES FOR WELL CONDUIT

Original Filed Aug. 11, 1958 2 Sheets-Sheet 1

INVENTOR.
ROBERT O. PARK
BY
Mellin and Hanscom
ATTORNEYS.

STOP DEVICES FOR WELL CONDUIT

Original Filed Aug. 11, 1958 2 Sheets-Sheet 2

INVENTOR.
ROBERT O. PARK
BY
Mellin and Hanscom
ATTORNEYS.

United States Patent Office

Re. 25,219
Reissued Aug. 7, 1962

25,219

STOP DEVICES FOR WELL CONDUIT

Robert O. Park, Lakewood, Calif., assignor to Baker Oil Tools, Inc., Los Angeles, Calif., a corporation of California Original No. 2,986,415, dated May 30, 1961, Ser. No. 754,329, Aug. 11, 1958. Application for reissue Sept. 28, 1961, Ser. No. 142,457

21 Claims. (Cl. 287—52)

Matter enclosed in heavy brackets [ ] appears in the original patent but forms no part of this reissue specification; matter printed in italics indicates the additions made by reissue.

The present invention relates to subsurface well bore equipment, and more particularly to stop devices adapted to be mounted on well casings, liners, tubings, and similar conduit strings, for engaging and moving other apparatus mounted on such strings through the well bore.

An object of the present invention is to provide a stop device adapted to be secured to well casings and the like without resort to a welding operation, which is capable of withstanding comparatively large longitudinally directed forces without slipping on the casing.

Another object of the invention is to provide a stop device of the character above indicated which is comparatively easy and economical to manufacture. As an example, most of the device can be produced on punch presses.

A further object of the invention is to provide a stop device of the character above indicated which is easy to mount on a well casing or similar conduit string. More specifically, the simple expedient of striking the device at a single point with a hammer firmly attaches the device to the casing.

An additional object of the invention is to provide a stop device of the character indicated which will be installed in a coaxial position on the well casing, the upper and lower ends of the device being normal to the axis of the well casing so that the device makes proper surface engagement with companion apparatus slidably mounted on the casing, such as a casing centralizer or wall scratcher.

This invention possesses many other advantages, and has other objects which may be made more clearly apparent from a consideration of several forms in which it may be embodied. Such forms are shown in the drawings accompanying and forming part of the present specification. These forms will now be described in detail, for the purpose of illustrating the general principles of the invention; but it is to be understood that such detailed description is not to be taken in a limiting sense, since the scope of the invention is best defined by the appended claims.

Referring to the drawings.

Figure 1:
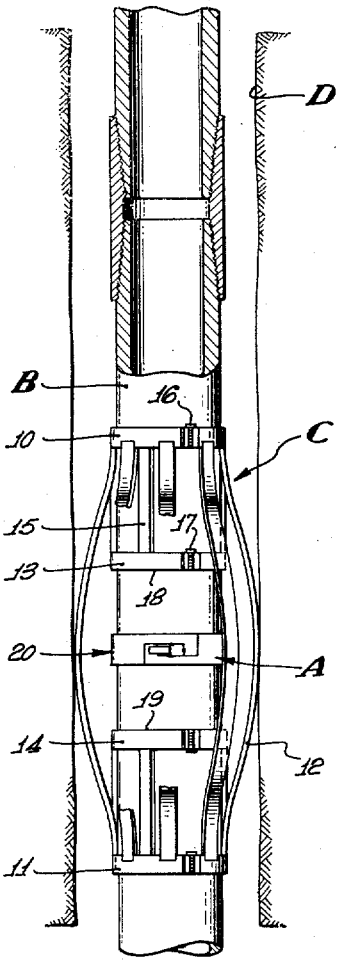
FIGURE 1 is a side elevation of an apparatus mounted on a string of well casing disposed in a well bore, parts being broken away for purposes of clarity.

As illustrated in the drawings, a stop device A is to be secured to a string of well casing B, or other running-in string, and is adapted to engage another apparatus C, such as a casing centralizer slidably mounted on the casing string. The device is shown in conjunction with a casing centralizer for illustrative purposes only, it being understood that it is also useful in other relationships, being adapted for engagement with wall scratchers, cementing baskets, and other apparatus that might be slidably mounted on a casing, or similar conduit string, tc be moved longitudinally therewith through the wel bore D.

As illustrated in the drawings, the casing centralizer C is mounted on the casing section B disposed in a wel bore D. This centralizer may take any desired form As specifically illustrated, it includes upper and lowe longitudinally spaced collars 10, 11 slidable on the cas ing section, the collars being interconnected by circum ferentially spaced outwardly bowed leaf spring member 12 welded or otherwise suitably secured thereto. Th intermediate portions of the springs engage the wall o the well bore D and tend to center the well casing there within B, in a known manner.

Upper and lower stop rings 13, 14 are secured in lor gitudinally spaced relation to the upper and lower co lars 10, 11, respectively, as by use of circumferentiall spaced, longitudinally extending rigid bars 15 attache to both the collars and the rings by welding, or in an other suitable manner.

The particular centralizer disclosed is of the hing type, in which the collars 10, 11 and the rings 13, 14 ar each made in two parts secured to one another by di metrically opposed hinges 16. The hinges on one sic of the device may be disconnected as by removing th hinge pins 17 which would then allow the casing ce tralizer C to be swung to open position and place laterally around the casing section B. Afterwards, th centralizer can be closed and the pins 17 reinserte through the hinge knuckles, all in a known manne The centralizer is thus slidably mounted on the casi section.

The centralizer or centering apparatus C is movab longitudinally through the well bore upon longitudin movement of the well casing B. A stop device A is s cured to the casing section between the upper and low stop rings 13, 14 and collars 10, 11, this device bei engageable with the inner edges 18, 19 of the rings 1 14 to force the centralizer apparatus through the w bore. Assuming the casing B to be moved downwarc in the well bore D, the stop device A engages the upp edge 19 of the lower stop ring 14 to pull the apparat C and its outwardly bowed springs 12 through the w bore and past any restrictions that might be encounter therein. On the other hand, movement of the casi string B in an upward direction will cause the stop c vice A to engage the lower edge 18 of the upper st ring 13 and pull the centering device C in an upwa direction with the casing string in the well bore.

Figure 2:
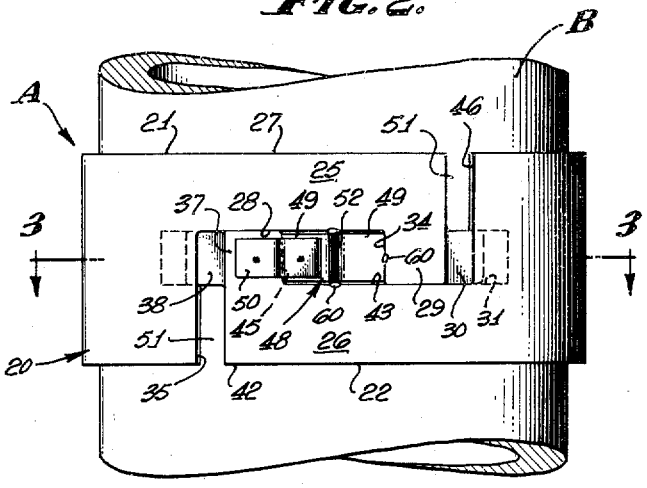
FIG. 2 is a side elevational view of the stop device mounted on a casing section prior to firm attachment of the device to the casing.

The particular stop device illustrated in FIGS. 2 to inclusive, on the drawings, is adapted to be moun over an end of the casing section B and secured there in a desired location, after which the casing centrali C is mounted laterally on the casing in the manner scribed above, with the stop device A disposed betwe the upper and the lower stop rings 13, 14. In the fo of stop device disclosed in FIG. 8, the centralizer other apparatus can be first mounted on the casing s tion, after which the stop device can be moved latera o appropriate assembled relation on the casing section B between the upper and lower stop rings 13, 14 of centralizing device, the stop device then being attached to the casing section as described hereinbelow.

As disclosed in FIGS. 1 to 7, inclusive, the stop device includes an annular member 20, such as a ring or sleeve generally cylindrial form, which has its upper and lower ends 21, 22 normal to its axis. This annular member has an inside diameter greater than the outside diameter of the casing section B on which it is to be mounted and to which it is to be secured, the annular member having inwardly extending teeth 23, 24 adapted to bite into and grip the outer surface of the casing section. As disclosed, an upper set of circumferentially spaced teeth 23 formed in the interior of the annular member 20, these teeth facing in a downward direction and being adapted to grip the exterior of the well casing to prevent relative downward movement of the annular member on the casing section. Similarly, another or lower set of circumferentially spaced teeth 24 is provided, facing in an upward direction and adapted to bite into or grip the casing section to prevent relative upward movement of the annular member or ring 20 with respect thereto.

The annular member is split, and after being placed on the casing section it is constricted to force its teeth 23, 24, into the exterior of the casing section B. The constricted space is disposed at one side of the annular member. The main body of the annular member has upper and lower arcuate body portions 25, 26 on opposite sides of its split which longitudinally overlap each other. Thus, an upper arcuate body portion 25 projects circumferentially from the main body portion, as in a counterclockwise direction as seen in the drawings, the upper end 27 of this body portion lying in the same plane as the upper end 21 of the main body portion. The lower side 28 of the arcuate body portion 25 is parallel to its upper end 27, being spaced upwardly by a substantial distance from the lower end 22 of the annular member 20. The free end of the upper arcuate body portion 25 is integral with a depending or longitudinally and downwardly extending head portion 29 terminating a substantial distance above the transverse plane in which the lower end 22 of the annular member lies. Integral with the head is a central tongue 30 which extends from the head in a counterclockwise direction as seen in the drawings. This tongue preferably lies in a central transverse plane of the annular member 20 normal to its axis and is movable arcuately within a common central groove 31 formed in the interior of the annular member. The base 32 of the groove and the upper surface 33 of the central tongue are preferably tapered so as to faciitate sliding of the tongue along the groove, and within, the groove.

It is to be noted that the left side 34 of the depending head 29 and the side or end 35 of the main body portion of the annular member are spaced arcuately from one another by a substantial distance, and that these sides are intersected by the lower end 28 of the arcuate body portion 25 defining a space adapted to receive the underlying arcuate body portion 26, which extends arcuately in a counterclockwise direction, as seen in the drawings, from the upper end of the main body portion. The lower arcuate body portion 26 is in overlapping relation to the upper body portion 25 and is actually a duplicate thereof. Thus, the end of the lower body portion 26 merges into a longitudinal or upwardly extending head 37 that terminates adjacent the lower side 28 of the upper body portion 25. On this head, a tongue 38 projects which is adapted to be received within a companion groove 39 within the upper body portion, this tongue and groove also preferably lying in the same central plane as the other tongue and groove 31, with the base 40 of the groove tapering from the end 35 of the main body portion in an inward direction for engagement by a companion external surface 41 on the central tongue. The lower end 42 of the lower arcuate body portion lies in the same plane normal to the axis of the annular member as the end 22 of the main body portion of the annular member, the upper end 43 of the underlying body portion 26 being disposed a substantial distance below the upper normal plane in which the end 21 of the main body lies, and adjacent to the lower end of the upper head 29 and upper central tongue 30. The side 45 of the lower head 37 and the opposite side or end 46 of the main body portion are spaced arcuately from one another for substantially the same distance as the side 34 of the upper head and the left side 35 of the main body to define a space with the upper end 21 of the lower body portion into which the upper head 29 and upper tongue 30 are received. The opposed sides 34, 35 of the heads 29, 37 are also spaced from one another, which is also true of the inner ends 28, 34 of the overlapping body portions 25, 26, defining a generally rectangular opening or space 47 into which a constricting device, actuator or wedge 48 can be disposed. As shown, this actuator is generally V-shaped, having a width substantially the same as the distance between the inner ends 28, 43 of the overlapping body portions 25, 26. The outer ends of its arms 49 are initially disposed adjacent the sides 34, 45 of the heads 29, 37. The actuator 48 is retained initially in the opening 47 to prevent its loss in any suitable manner, as through use of a flexible strap 50 which may be spot welded to one of the heads 37 and also to one arm 49 of the actuator 48.

Figure 3:
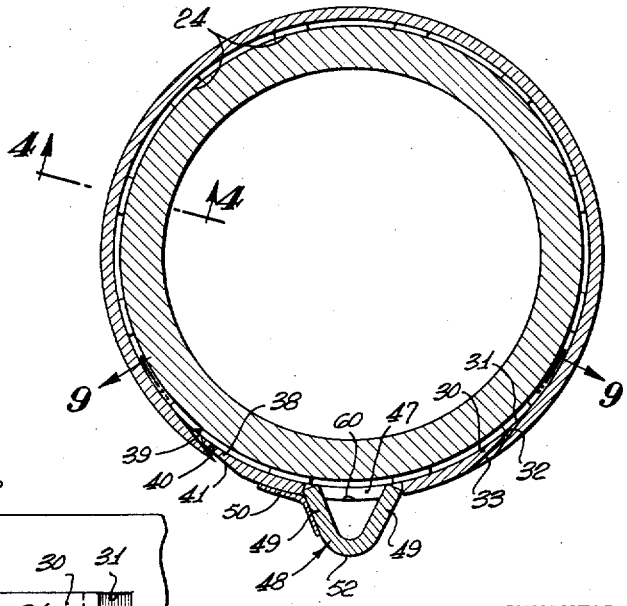
FIG. 3 is a cross section taken along the line 3—3 on FIG. 2.
Figure 9:
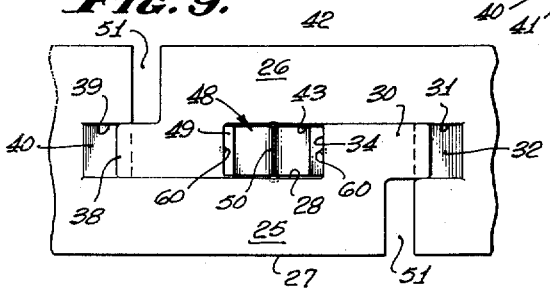
FIG. 9 is a section of the stop device taken generally along the line 9—9 on FIG. 3.
Figure 4:
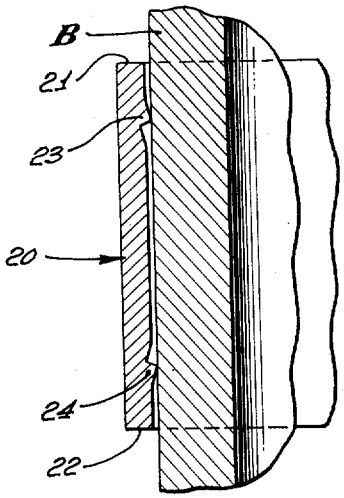
FIG. 4 is an enlarged fragmentary section taken along the line 4—4 on FIG. 3.
Figure 5:
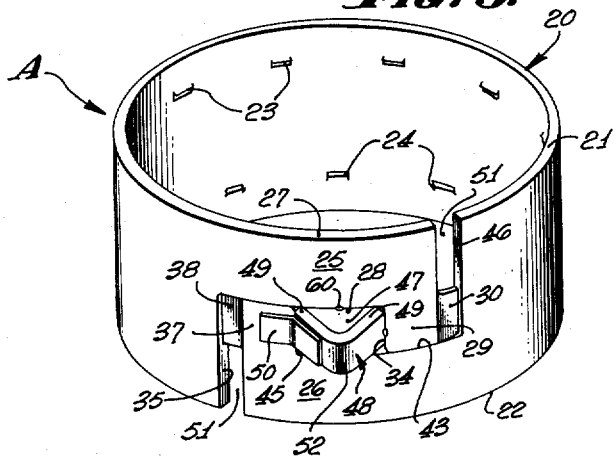
FIG. 5 is an isometric projection of a stop device prior to its being mounted on a well casing.
Figure 6:
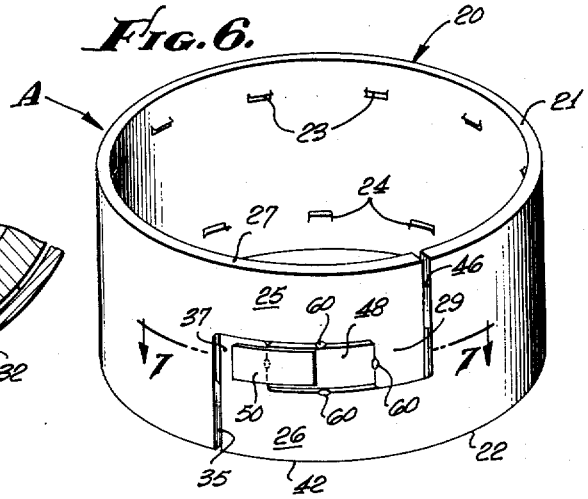
FIG. 6 is a view similar to FIG. 5, illustrating the stop device when constricted for attachment to the well casing.
Figure 7:
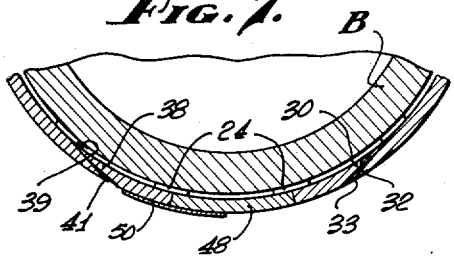
FIG. 7 is a section taken along the line 7—7 on FIG. 6.

When the stop ring is in its initial position, its parts are relatively positioned as illustrated in FIGS. 2, 3, and 5. When in such position, the effective diameter across the gripping teeth 23 and 24 is slightly greater than the outside diameter of the casing section B on which the stop device is to be mounted. At this time, the tongues 30, 38 are disposed partially within their companion grooves 31, 39, there being a substantial arcuate gap 51 between the end of each body portion 25, 26 and the adjacent side 46, 35 of the main body portion of the annular member 20. At this time, also, the actuator 48 is of the V-shape disclosed, with its central portion 52 projecting laterally outwardly of the ring and with the end portions of its arms 49 adjacent to or in contact with the opposed sides 34, 45 of the head portions 29, 37.

The stop device A is slipped over the end of the casing section B and is moved to the position at which it is to be secured thereto. When such position is reached, hammer blows are struck upon the central portion 52 of the actuator 48, tending to straighten the actuator in an inward direction and causing its arms 49 to shift the heads 29, 37 in opposite directions. Thus, the right head 29 is shifted in a counterclockwise direction and the left head 37 is shifted in a clockwise direction, to effect a constricting of the annular member 20 against the casing and an embedding of its teeth 23, 24 in the exterior of the casing. The parts are so proportioned that the actuator 48 can be struck repeatedly with the hammer until it is disposed in substantially the flat condition shown in FIGS. 6 and 7, at which the diameter of the annular member 20 has been decreased sufficiently to insure a digging in or embedding of its teeth 23, 24 in the exterior of the well casing. The flattened actuator 48 then serves as a lock or a relatively rigid bar, preventing expansion of the annular member 20 and its release from the well casing B.

During the inward hammering of the actuator 48, assurance is had that the annular member 20 does not tilt relative to the axis of the well casing, since the sliding of the central tongues 30, 38 within their companion grooves 31, 39 will maintain the upper and lower ends 21, 22 of the annular member in upper and lower central planes normal to the axis of the casing. Accordingly, the upper and lower ends of the annular member will engage the companion apparatus, such as the upper and lower stop rings 13, 14 of the casing centralizer, over substantially their full circumferential surface.

It is further to be noted that the arcuate spaces 51 that initially existed between the ends 46, 35 of the main body portion of the annular member and the opposed ends of its overlapping portions 25, 26 are such that such ends will not contact one another when the actuator 48 has been hammered inwardly to its fullest extent. The tapered surfaces 33, 41, 32, 40 on the tongues 30, 38 and the bottoms of the grooves 31, 39 will not only insure appropriate relative sliding between the parts as the annular member 20 is constricted, but will also insure that the ends of the tongues will not engage any ends of the grooves. In fact, the grooves do not have any inner ends since their tapered bottoms 32, 40 extend to the inner surface of the annular member 20.

As assurance that the actuator 48 will remain in its inward hammered position, to hold the annular member 20 constricted upon the casing, retainer portions can be struck from the overlapping body portions 25, 26 and heads 29, 37. Thus, as disclosed, a center punch or the like can be struck with a hammer to force some of the metal 60 of the head portions 29, 37 and the overlapping body portions 25, 26 inwardly of the opening 47. Such inwardly projecting metal portions 60 will not interfere with the inward hammering of the actuator 48 to a comparatively flat condition against the casing section B. Since the actuator is made of a malleable metal, the hammer blows will actually result in a deformation of some of the actuator material under the retainer punches 60, the overlapping of the center punches 60 thus provided insuring that the actuator 48 cannot shift outwardly from the opening 47.

The stop device A illustrated is capable of withstanding large longitudinal forces without slipping on the casing section B. Actual tests have shown that it will withstand in excess of ten thousand pounds force on all grades of casing, including casing made from heat treated and alloy steels. Actually, in some grades of casing, the stop ring has withstood forces in excess of thirty thousand pounds. The forces mentioned above are far greater than those actually encountered in a well bore in connection with moving another apparatus, such as a casing centralizer or a wall scratcher, longitudinally in the well bore.

In addition to its ability to withstand and transmit high loads, the apparatus is very simple to construct and also economical to produce. Its various portions can be formed on a punch press. The teeth 23, 24 can be upset from the inner wall of the annular member 20 on a punch press, and its various overlapping portions can also be formed on a punch press. This is also true of the center punch retainer portions 60 that insure against removal of the actuator 48 from its locked position between the heads 29, 37. Assurance is also had that the apparatus will be mounted "square" on the casing sections in view of the guiding action provided by the tongues 30, 38 within the grooves 31, 39.

Figure 8:
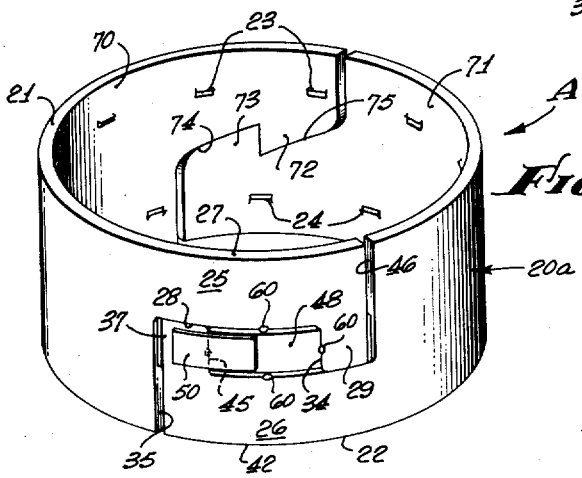
FIG. 8 is an isometric projection similar to FIG. 6 of a modified form of the invention.

The form of invention disclosed in FIG. 8 is substantially the same as the one previously described, except that the annular member 20a is made in two parts or segments 70, 71 to enable the segments to be moved laterally over the casing B and then interlocked with respect to one another. Thus, the annular member, in effect, is provided with another split opposite its locking portion, these segments having oppositely disposed hooks 72, 73 that interlock with one another. One segment 71 has an upwardly extending hook 73 received within a companion recess 74 in the other segment 70 which has a downwardly extending hook 72 received within a companion recess 75 in the first-mentioned member. The segments 70, 71 are placed over the casing and then moved longitudinally toward each other so that the hooks 72, 73 overlap and interlock, with the head portions 29, 37 also longitudinally overlapping, the tongues 30, 38 being inserted in their companion grooves 31, 39. The actuator 48 will, of course, be disposed within the opening 47 between the head portions 29, 37. The striking of hammer blows upon the actuator 48 will spread its arm portions 49 apart and constrict the band 20, the hooks 72, 73 on the diametrically opposite portion coupling the segments 70, 71 to one another. The locking action occurs in the same manner as described above in connection with the other form of the invention.

The inventor claims:

1. In a stop device adapted to be mounted on a running-in string to be disposed in a well bore: a split annular member adapted to be disposed on the running-in string, said member having overlapping portions at its split, *said portions being in substantial longitudinal alignment with each other when disposed on the running-in string*; and means having portions engaging said overlapping portions and movable in opposite directions away from each other circumferentially of said member to force said overlapping portions away from each other to constrict said member into gripping engagement with the running-in string.

2. In a stop device adapted to be mounted on a running-in string to be disposed in a well bore: a split annular member adapted to be disposed on the running-in string, said member having arcuately overlapping portions at its split and longitudinally overlapping portions extending longitudinally from said arcuately overlapping portions; and means engaging said longitudinally overlapping portions to force said longitudinally overlapping portions away from each other to constrict said member into gripping engagement with the running-in string.

3. In a stop device adapted to be mounted on a running-in string to be disposed in a well bore: a split annular member adapted to be disposed on the running-in string, said member having overlapping portions at its split; means engaging said overlapping portions and movable in a direction circumferentially of said member to force said portions away from each other to constrict said member into gripping engagement with the running-in string; and coengaging means on said member for maintaining said member coaxial with the running-in string during its constriction thereon.

4. In a stop device adapted to be mounted on a running-in string to be disposed in a well bore: a split annular member adapted to be disposed on the running-in string, said member having arcuately overlapping portions at its split and longitudinally overlapping portions extending longitudinally from said arcuately overlapping portions; means engaging said longitudinally overlapping portions to force said longitudinally overlapping portions away from each other to constrict said member into gripping engagement with the running-in string; and coengaging means on said member for maintaining said member coaxial with the running-in string during its constriction thereon.

5. In a stop device adapted to be mounted on a running-in string to be disposed in a well bore [;]: a split annular member adapted to be disposed on the running-in string, said member having overlapping portions at its split; means engaging said overlapping portions to force said portions away from each other to [construct] *constrict* said member into gripping engagement with the running-in string; a tongue secured to each overlapping portion and slidably received in a companion groove in the annular member to maintain said member coaxial with the running-in string during its constriction thereon.

6. In a stop device adapted to be mounted on a running-in string to be disposed in a well bore: a split annular member adapted to be disposed on the running-in string, said member having arcuately overlapping portions at its split and longitudinally overlapping portion extending from said arcuately overlapping portions means engaging said longitudinally overlapping portion to force said longitudinally overlapping portions away from each other to constrict said member into gripping engagement with the running-in string; and a tongue se ıred to each *longitudinally* overlapping portion and slida-
ly received in a companion groove in the annular mem-
er to maintain said member coaxial of the running-in
ring during its constriction thereon.

7. In a stop device adapted ot be mounted on a
ınning-in string to be disposed in a well bore: a split
nnular member adapted to be disposed on the running-
ı string, said member having overlapping portions at its
plit; a deformable actuator in a plane of said member
ormal to its axis and *having inner ends* engaging said
verlapping portions and projecting in said plane *from*
*s inner ends* laterally outwardly of said member, said
ctuator being adapted to be forced laterally inwardly in
ıe plane of said annular member by hammer blows to
orce said portions away from each other to constrict said
ıember into gripping engagement with the running-in
ring.

8. In a stop device adapted to be mounted on a run-
ing-in string to be disposed in a well bore: a split an-
ular member adapted to be disposed on the running-in
ring, said member having overlapping portions at its
plit; a deformable actuator engaging said overlapping
ortions and projecting laterally outwardly of said mem-
er, said actuator being adapted to be [force] *forced* in-
ardly by hammer blows to force said portions away
om each other to constrict said member into gripping
ıgagement with the running-in string; and means on
id overlapping portions engageable with said actuator
r retaining said actuator in its inward position.

9. In a stop device adapted to be mounted on a run-
ng-in [strip] *string* to be disposed in a well bore: a
plit annular member adapted to be disposed on the run-
ng-in string, said member having arcuately overlap-
ng portions at its split and longitudinally overlapping
ortions extending longitudinally from said arcuately
verlapping portions; a deformable actuator engaging
id longitudinally overlapping portions and projecting
terally outwardly of said member, said actuator being
lapted to be forced inwardly by hammer blows to force
id longitudinally overlapping portions way from each
her to constrict said member into gripping engagement
ith the running-in string.

10. In a stop device adapted to be mounted on a run-
ng-in string to be disposed in a well bore: a split an-
ılar member adapted to be disposed on the running-in
ring, said member having overlapping portions at its
plit; a deformable actuator engaging said overlapping
ortions and projecting laterally outwardly of said mem-
er, said actuator being adapted to be forced inwardly by
ımmer blows to force said portions away from each
her to constrict said member into gripping engagement
ith the running-in string; and a tongue secured to each
verlapping portion and slidably received in a companion
oove in the annular member to maintain said member
axial of the running-in string during its constriction
ereon.

11. In a stop device adapted to be mounted on a run-
ng-in string to be disposed in a well bore: a split an-
ılar member adapted to be disposed on the running-in
ring, said member having overlapping portions at its
plit; a deformable actuator engaging said overlapping
ortions and projecting laterally outwardly of said mem-
er, said actuator being adapted to be forced inwardly by
ımmer blows to force said portions away from each
her to constrict said member into gripping engagement
ith the running-in string; a tongue secured to each over-
pping portion and slidably received in a companion
oove in the annular member to maintain said member
axial of the running-in string during its constriction
ereon; and means on said overlapping portions engage-
le with said actuator for retaining said actuator in its
ward position.

12. In a stop device adapted to be mounted on a run-
ng-in string to be disposed in a well bore: a split an-
ılar member adapted to be disposed on the running-in string and having inner teeth therein, said member having arcuately overlapping portions at its split and longitudinally overlapping portions extending from said arcuately overlapping portions; a deformable actuator engaging said longitudinally overlapping portions and projecting laterally outwardly of said member, said actuator being adapted to be forced inwardly by hammer blows to force said portions way from each other to constrict said member and cause its teeth to grip the running-in string; and a tongue secured to each longitudinally overlapping portion and slidably received in a companion groove in the annular member to maintain said member coaxial of the running-in string during its constriction thereon.

13. In a stop device adapted to be mounted on a running-in string to be disposed in a well bore: a split annular member adapted to be disposed on the running-in string and having inner teeth therein, said member having arcuately overlapping portions at its split and longitudinally overlapping portions extending from said arcuately overlapping portions; an initially generally V-shaped deformable actuator disposed between and engaging said longitudinally overlapping portions and projecting laterally outwardly of said member, said actuator being adapted to be forced inwardly toward the running-in string by hammer blows to be deformed toward a flat condition and force said longitudinally overlapping portions away from each other to constrict said member and cause its teeth to grip the running-in string; and a tongue secured to each longitudinally overlapping portion and slidably received in a companion groove in the annular member to maintain said member coaxial of the running-in string during its constriction thereon.

14. In a stop device adapted to be mounted on a running-in string to be disposed in a well bore: a split annular member adapted to be disposed on the running-in string, said member having overlapping portions at its split; and actuator means in a plane of said member normal to its [axial] *axis* and extending between and *having inner ends* engaging said overlapping portions and projecting in said plane *from its inner ends* laterally outwardly of said member, said actuator means being adapted to be forced laterally inwardly in the plane of said annular member to force said portions away from each other to constrict said member into gripping engagement with the running-in string.

15. In a stop device adapted to be mounted on a running-in string to be disposed in a well bore: a split annular member adapted to be disposed on the running-in string, said member having overlapping portions at its split; and actuator means in a plane of said member normal to its axis and extending between said overlapping portions and projecting in said plane laterally outwardly of said member, said actuator means having ends engaging said overlapping portions *and said actuator means projecting laterally outwardly from said ends,* said actuator means being adapted to be forced laterally inwardly in the plane of said member to force its ends circumferentially further apart and thereby force said portions away from each other to constrict said member into gripping engagement with the running-in string.

16. In a stop device adapted to be mounted on a running-in string to be disposed in a well bore: a split annular member adapted to be disposed on the running-in string, said member having overlapping portions at its split; a deformable actuator in a plane of said member normal to its axis and engaging said overlapping portions and projecting in said plane laterally outwardly of said member, said actuator having ends engaging said overlapping portions *and said actuator means projecting laterally outwardly from said ends,* said actuator being adapted to be forced laterally inwardly in the plane of said annular member by hammer blows toward said annular member to force its ends circumferentially further apart and thereby force said portions away from each other to constrict said member into gripping engagement with the running-in string.

17. In a stop device adapted to be mounted on a running-in string to be disposed in a well bore: a split annular member adapted to be disposed on the running-in string, said member having overlapping portions at its split; a deformable, generally V-shaped actuator having arms secured to each other at an angle to each other and projecting laterally outwardly of said member, the inner portions of said arms *extending outwardly of said member from their inner ends and* being in engagement with said overlapping portions, said arms being adapted to be forced inwardly by hammer blows to increase the angle between said arms and force *said inner ends of said arms and* said overlapping portions away from each other to constrict said member into gripping engagement with the running-in string.

18. In a stop device adapted to be mounted on a running-in string to be disposed in a well bore: a split annular member adapted to be disposed on the running-in string, said member having overlapping portions at its split; and actuator means having arms secured to each other at an angle to each other and projecting laterally outwardly of said member, the inner portions of said arms *extending outwardly of said member from their inner ends and* being in engagement with said overlapping portions, said arms being adapted to be forced laterally inwardly to force *said inner ends of said arms and* said overlapping portions away from each other to constrict said member into gripping engagement with the running-in string.

*19. In a stop device adapted to be mounted on a running-in string to be disposed in a well bore: a split annular member adapted to be disposed on the running-in string, said member having overlapping portions at its split; means engaging said overlapping portions and movable in a direction circumferentially of said member to force said portions away from each other to constrict said member into gripping engagement with the running-in string; said member including coengaging means for maintaining said member coaxial with the running-in string during its constriction thereon.*

*20. In a stop device adapted to be mounted on a running-in string to be disposed in a well bore: a split annu-*

*lar member adapted to be disposed on the running-string, said member having overlapping portions at split, said portions being in substantial longitudinal alig ment with each other when disposed on the running-string; a deformable, generally V-shaped actuator havi arms secured to each other at an angle to each other a projecting laterally outwardly of said member, the inn portions of said arms extending outwardly of said me ber from their inner ends and being in engagement w said overlapping portions, said arms being adapted to forced inwardly by hammer blows to increase the an between said arms and force said inner ends of said in arms and said overlapping portions away from each ot to constrict said member into gripping engagement w the running-in string.*

*21. In a stop device adapted to be mounted on a ru ning-in string to be disposed in a well bore: a split nular member adapted to be disposed on the running string, said member having overlapping portions at split, said portions being in substantial longitudinal ali ment with each other when disposed on the running string; a deformable, generally V-shaped actuator hav arms secured to each other at an angle to each other projecting laterally outwardly of said member, the in portions of said arms extending outwardly of said me ber from their inner ends and being in engagement w said overlapping portions, said arms being adapted to forced inwardly by hammer blows to increase the an between said arms and force said inner ends of said in arms and said overlapping portions away from each ot to constrict said member into gripping engagement w the running-in string; said member including coengag means for maintaining said member coaxial with running-in string during its constriction thereon.*

References Cited in the file of this patent or the original patent

UNITED STATES PATENTS

| | | |
|---|---|---|
| 903,593 | Lowendahl | Nov. 10, 1 |
| 2,846,016 | Hanes | Aug. 5, 1 |

FOREIGN PATENTS

| | | |
|---|---|---|
| 87,216 | Germany | June 24, 1 |